United States Patent
Goergen et al.

(10) Patent No.: US 8,557,220 B2
(45) Date of Patent: Oct. 15, 2013

(54) PROCESS FOR PREPARING EU-1 ZEOLITE

(75) Inventors: Simone Goergen, Lyons (FR); Loïc Rouleau, Charly (FR); Joël Patarin, Flaxlanden (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 250 days.

(21) Appl. No.: 12/601,199

(22) PCT Filed: Apr. 14, 2008

(86) PCT No.: PCT/FR2008/000525
§ 371 (c)(1),
(2), (4) Date: Nov. 20, 2009

(87) PCT Pub. No.: WO2008/152214
PCT Pub. Date: Dec. 18, 2008

(65) Prior Publication Data
US 2010/0178241 A1 Jul. 15, 2010

(30) Foreign Application Priority Data
May 25, 2007 (FR) .................................... 07 03701

(51) Int. Cl.
*C01B 33/36* (2006.01)
*C01B 39/36* (2006.01)
*C01B 39/00* (2006.01)
*C01F 7/00* (2006.01)

(52) U.S. Cl.
USPC ............ 423/700; 423/702; 423/707; 423/709

(58) Field of Classification Search
USPC ................................................ 423/700–718
See application file for complete search history.

(56) References Cited

U.S. PATENT DOCUMENTS

| | | | | |
|---|---|---|---|---|
| 4,537,754 A * | 8/1985 | Casci et al. | ................... | 423/708 |
| 5,785,947 A * | 7/1998 | Zones et al. | ................... | 423/705 |
| 6,337,063 B1 * | 1/2002 | Rouleau et al. | ............... | 423/705 |
| 6,342,200 B1 * | 1/2002 | Rouleau et al. | ............... | 423/709 |
| 7,923,398 B2 * | 4/2011 | Patarin et al. | ................... | 502/60 |
| 2001/0056032 A1 * | 12/2001 | Loic et al. | ....................... | 502/64 |

OTHER PUBLICATIONS

"International Search Report," International Application No. PCT/FR2008/000525, date of completion Oct. 15, 2008, date of mailing Oct. 21, 2008, 2pages.
Arnold et al: "Dry-gel synthesis of zeolites [Al] EU-1", Microporous and Mesoporous Materials, Elsvier Science Publishing, New York, US. vol. 67, No. 2-3, date Feb. 6, 2004, pp. 205-213 XP004485734 ISSN: 1387-1811.
Arnold et al: "Insight into the dry-gel synthesis of gallium-rich zeolite [Ga] Beta," Institue of Chemical Technology, University of Stuttgart, D-70550 Stuttgart, Germany Bruker BioSpin GmbH, D-76287 Microporous and Mesoporous Materials, accepted May 2, 2003.

* cited by examiner

Primary Examiner — Bijay Saha
(74) Attorney, Agent, or Firm — Millen, White, Zelano, Branigan, P.C.

(57) ABSTRACT

The invention concerns a process for preparing an EU-1 zeolite having a $XO_2/Y_2O_3$ ratio in the range 10 to 100, comprising the following steps:
  a) mixing, in an aqueous medium, at least one source of at least one oxide $XO_2$, X being selected from silicon and/or germanium, at least one source of at least one oxide $Y_2O_3$, Y being selected from aluminium, iron, gallium and boron, and at least one organic template Q;
  b) drying the reaction mixture derived from step a) at a temperature of less than 200° C.;
  c) hydrothermal treatment of the dried reaction mixture derived from step b) in an autoclave, said dried reaction mixture not being in contact with a liquid phase at the bottom of the autoclave.

19 Claims, No Drawings

PROCESS FOR PREPARING EU-1 ZEOLITE

FIELD OF THE INVENTION

The present invention relates to a novel process for preparing an EU-1 zeolite with a $XO_2/Y_2O_3$ ratio in the range 10 to 100 and in particular a $SiO_2/Al_2O_3$ ratio in the range 10 to 100, employing a drying step b) carried out following a step for preparing a reaction mixture and prior to a hydrothermal treatment step c).

PRIOR ART

EU-1 zeolite with structure type EUO has been described in the prior art (W M Meier and D H Olson, "Atlas of Zeolite Structure Types", 5$^{th}$ edition, 2001) and has a unidimensional microporous framework with a pore diameter of 4.1×5.7 Å (1 Å=1 Angstrom=1×10$^{-10}$ m). N A Briscoe et al have shown that such unidimensional channels have side pockets with a depth of 8.1 Å and a diameter of 6.8×5.8 Å (Zeolites 8, 74, 1988).

European patent application EP-A-0 042 226 describes EU-1 zeolite with the following formula:

at least $10XO_2:Y_2O_3:0.5-1.5R_{2/n}O:0-100\ H_2O$ where R represents a cation with valency n, X represents silicon and/or germanium, Y represents at least one element selected from aluminium, iron, gallium, boron, as well as a process for preparing said EU-1 zeolite. The preparation process comprises mixing, in an aqueous medium, at least one source of an element X, at least one source of an element Y and an organic nitrogen-containing compound acting as a template Q, which is either the alkylated derivative of an α-ω diammonium polymethylene or a degradation product of said derivative, or precursors of said derivative. The reaction mixture is then placed under autogenous pressure at a temperature in the range 85° C. to 250° C. until zeolite crystals are formed.

Dodwell et al (Zeolites, volume 5, 1985, May, pages 153 to 157) describes the hydrothermal synthesis of an EU-1 zeolite with a reaction mixture containing no alkaline ions. The hexamethonium cation in the hydroxide form acting as a template provides a sufficient mineralizing agent and so it is not necessary to add an alkali hydroxide.

SUBJECT MATTER OF THE INVENTION

The present invention concerns a novel process for preparing an EU-1 zeolite having a $XO_2/Y_2O_3$ ratio in the range 10 to 100, comprising the following steps:
a) mixing, in an aqueous medium, at least one source of at least one oxide $XO_2$, X being selected from silicon and/or germanium, at least one source of at least one oxide $Y_2O_3$, Y being selected from aluminium, iron, gallium and boron, and at least one organic template Q;
b) drying the reaction mixture derived from step a) at a temperature of less than 200° C.;
c) hydrothermal treatment of the dried reaction mixture derived from step b) in an autoclave, said dried reaction mixture not being in contact with a liquid phase at the bottom of the autoclave.

One advantage of the invention is that a novel process for preparing an EU-1 zeolite is provided which can reduce the synthesis time for said EU-1 zeolite.

Another advantage of the invention is that a novel process for preparing an EU-1 zeolite is provided, which means that an EU-1 zeolite can be obtained with a higher crystallinity than that of an EU-1 zeolite obtained by preparation processes which are known to the skilled person.

DESCRIPTION OF THE INVENTION

In accordance with the invention, step a) of the process for preparing an EU-1 zeolite with a $XO_2/Y_2O_3$ ratio in the range 10 to 100, preferably in the range 20 to 60 and highly preferably in the range 30 to 50, consists of preparing an aqueous reaction mixture comprising at least one source of at least one oxide $XO_2$, X being selected from silicon and/or germanium, with X preferably being silicon, at least one source of at least one oxide $Y_2O_3$, Y being selected from aluminium, iron, gallium and boron, with Y preferably being aluminium, and at least one organic template Q, with Q preferably being hexamethonium hydroxide.

Said reaction mixture advantageously has the following molar composition:

| | |
|---|---|
| $XO_2/Y_2O_3$ | 10 to 100, preferably 20 to 60, highly preferably 30 to 50; |
| $OH^-/XO_2$ | 0.1 to 6.0, preferably 0.1 to 1.0; |
| $(M^+ + Q)/Y_2O_3$ | 0.5 to 100; |
| $Q/(M^+ + Q)$ | 0.1 to 1; |
| $H_2O/XO_2$ | 1 to 100; |
| $M^+/XO_2$ | 0 to 0.3, preferably 0 to 0.2, more preferably 0 to 0.15, highly preferably 0.01 to 0.12; | where $M^+$ represents a monovalent cation deriving from sources of the elements X and Y, selected from alkali metals or ammonium. Preferably, $M^+$ is sodium, $Na^+$.

In accordance with a preferred implementation of step a) of the preparation process of the invention, said mixture is characterized by a low monovalent cation $M^+$ content, preferably $Na^+$ alkali ions. Preferably, said mixture is characterized by a $Na^+/SiO_2$ ratio in the range 0 to 0.3, preferably in the range 0 to 0.2 and highly preferably in the range 0 to 0.15 and still more preferably in the range 0.01 to 0.12.

The source of the element X may advantageously be any compound comprising the element X and which can liberate that element in aqueous solution in a reactive form. In accordance with the preferred implementation in which the element X is silicon, the source of silicon may be any one of those which are routinely used in zeolite synthesis, for example solid powdered silica, silicic acid, colloidal silica or dissolved silica, or tetraethoxysilane (TEOS). Examples of powdered silicas which may be used are precipitated silicas, especially those obtained by precipitation from a solution of an alkali metal silicate, pyrogenic silicas, for example "Aerosil" and silica gels. It is possible to use colloidal silicas with different particle sizes, for example with a mean equivalent diameter in the range 10 to 15 nm or in the range 40 to 50 nm, such as those sold under the trade name "LUDOX".

The source of the element Y may advantageously be any compound comprising the element Y and which can liberate that element in aqueous solution in the reactive form. In accordance with a preferred implementation in which Y is aluminium, the source of aluminium is preferably sodium aluminate, or an aluminium salt, for example a chloride, a nitrate, a hydroxide or a sulphate, an aluminium alkoxide or alumina proper, preferably in the hydrated or hydratable form, such as colloidal alumina, pseudoboehmite, gamma alumina or alpha or beta trihydrate. It is also possible to use mixtures of the sources cited above.

In accordance with a preferred implementation of step a) of the preparation process of the invention, an aqueous mixture comprising silica, sodium aluminate and hexamethonium hydroxide may be reacted.

In accordance with another preferred implementation of step a) of the preparation process of the invention, an aqueous mixture comprising silica, an aluminium alkoxide and hexamethonium hydroxide is reacted.

The quantities of said reagents defined above are adjusted in order to provide said reaction mixture with a composition allowing it to crystallize to an EU-1 zeolite.

In accordance with a preferred implementation of step a) of the preparation process of the invention, it may be advantageous to add seeds to the reaction mixture in order to reduce the time necessary for the formation of crystals and/or the total crystallization period. It may also be advantageous to use seeds in order to encourage the formation of solid crystalline EU-1 to the detriment of the impurities. Such seeds comprise crystalline solids, especially crystals of zeolite with structure types LTA, LTL, FAU, MOR, MAZ, OFF, FER, ERI, BEA, MFI, MTW, MTT, LEV, TON, NES or EUO. The crystalline seeds are generally added in a seeds/$XO_2$ ratio in the range 0.0001 to 0.1 $XO_2$ by weight. In accordance with step b) of the preparation process of the invention, the reaction mixture from step a) is dried at a temperature of less than 200° C., preferably less than 120° C. and highly preferably less than 100° C., by evaporating off the water. Said drying is carried out using any technique which is known to the skilled person and preferably by heating, which is advantageously carried out at a temperature of less than 120° C. and preferably at a temperature of less than 100° C. At the end of said drying, a dried reaction mixture is obtained constituted by a solid phase of EU-1 zeolite precursors, containing a quantity by weight of water, h, of less than 40% by weight with respect to the total weight of said dried reaction mixture, preferably less than 25% by weight and more preferably less than 20% by weight.

In accordance with step c) of the preparation process of the invention, said dried reaction mixture from step b) of the preparation process undergoes a hydrothermal treatment in an autoclave, said dried reaction mixture not being in contact with a liquid phase at the bottom of the autoclave.

A mass, m, of dried reaction mixture from step b) of the preparation process of the invention, constituted by a solid phase of precursors of the EU-1 zeolite, is advantageously placed on a non-oxidizable support located in the upper or central portion of an autoclave with a volume V, with a volume of distilled water corresponding to a mass, H, of distilled water being introduced into the bottom.

Since the density of the distilled water is 1, the mass of distilled water H introduced into the bottom of the autoclave and corresponding to the volume of distilled water introduced is expressed as a function of the volume V of the autoclave.

The mass H of distilled water introduced into the bottom of the autoclave is advantageously in the range 0 to 0.5 V, preferably in the range 0 to 0.1 V and highly preferably in the range 0 to 0.06 V. The water at the bottom of the autoclave is not in contact with the dried reaction mixture constituted by a solid phase of precursors of the EU-1 zeolite.

In order to allow the EU-1 zeolite to form, step c) of the preparation process of the present invention is carried out in the presence of a liquid phase. The term "liquid phase" means the water present either in the solid phase of solid precursors of the EU-1 zeolite constituting the dried reaction mixture or the distilled water introduced into the bottom of the autoclave or both thereof.

As the temperature inside the autoclave increases, the distilled water which may have been introduced into the bottom of the autoclave, as well as the water which may still be contained in the solid phase of the solid precursors for the EU-1 zeolite constituting the dried reaction mixture, evaporates off. In accordance with step c) of the preparation process of the invention, the total quantity of water in the autoclave, corresponding to the quantity of water contained in the solid phase of solid precursors for the EU-1 zeolite, supplemented by the quantity of distilled water introduced into the bottom of the autoclave and which is equal to 0.01*h*m+H, is such that the pressure generated by the steam reaches at least the saturated vapour pressure, and the water can re-condense.

In accordance with step c) of the preparation process of the invention, the dried reaction mixture is not in contact with a liquid phase at the bottom of the autoclave, i.e. it is not in contact with any other liquid phase apart from that deriving from re-condensation of the water. The quantity by weight of water, h, contained in the solid phase of the solid precursors for the EU-1 zeolite and the mass of distilled water, H, introduced into the bottom of the autoclave are thus not simultaneously zero.

The total minimum quantity of water which is necessary may be estimated using the following Van der Waals equation:

$$(P_{vap}+a*n^2/V)(V-n*b)=n*R*T$$

in which $P_{vap}$ is the saturated vapour pressure of water at the temperature T (Pa), T is the temperature of the hydrothermal treatment (K), V is the volume of the autoclave, n is the number of moles of water present in the autoclave; in this case n is equal to (0.01*h*m+H)/M, where M is the molar mass of water (18 g/mol), R is the gas constant (8.314472(15) J/mol.K), a and b are characteristic constants of water and are calculated using the following relationships:

$$a=27*(R^2*T_c^2/64*P_c)=0.55350 \text{ Pa}*(m^3/mol)^2 \text{ and}$$

$b=R*T_c/8*P_c=0.00003$ m$^3$/mol, where $T_c$ is the critical temperature of water (647.24 K) and $P_c$ is the critical pressure of water (22064 Pa) (CRC Handbook of Chemistry and Physics, 82$^{nd}$ edition).

More precisely, three preferred implementations of step c) of the preparation process of the invention may be employed.

In accordance with a first preferred implementation of step c) of the preparation process of the invention, the completely dry reaction mixture from step b) is introduced into the autoclave, i.e. it contains a quantity by weight of water, h, equal to 0%, and a mass, H, of distilled water is introduced into the bottom of the autoclave. The overall introduction of water is such that the total quantity of water in the autoclave is greater than or equal to the quantity of water which satisfies the Van der Waals equation.

In accordance with a second preferred implementation of step c) of the preparation process of the invention, the partially dried reaction mixture from step b), i.e. containing a quantity by weight of water, h, is introduced into the autoclave, and a mass, H, of distilled water is introduced into the bottom of the autoclave. The overall introduction of water is such that the total quantity of water in the autoclave is greater than or equal to the quantity of water which satisfies the van der Waals equation.

In accordance with a third preferred implementation of step c) of the preparation process of the invention, the reaction mixture from step b) which is introduced into the autoclave has been partially dried to a weight content of water, h. The overall introduction of water is such that the total quantity of water in the autoclave, namely the quantity of water contained in the solid phase of solid precursors of the EU-1 zeolite constituting the dried reaction mixture, is greater than or equal to the quantity of water which satisfies the van der Waals equation.

In accordance with the third preferred implementation, no distilled water is introduced into the bottom of the autoclave.

Step c) of the preparation process of the invention is preferably carried out in accordance with the first and second implementations described above.

The dried reaction mixture from step b) of the preparation process of the invention is advantageously subjected to the following hydrothermal conditions for step c): an autogenous reaction pressure, a temperature in the range 120° C. to 220° C., preferably in the range 140° C. to 200° C., and highly preferably a temperature in the range 150° C. to 190° C., until crystals of solid EU-1 are formed.

The reaction time necessary to obtain crystallization of the EU-1 zeolite generally varies between 1 hour and several months, preferably in the range 1 day to 3 weeks, and more preferably in the range 2 to 8 days, depending on the composition of the reagents in the reaction mixture and of the reaction temperature.

At the end of step c) of the preparation process of the invention, the solid crystalline phase obtained is washed. The EU-1 zeolite with structure type EUO obtained using the preparation process of the invention is said to be as-synthesized. It is then ready for the subsequent steps such as drying, dehydration and calcining and/or ion exchange. For these steps, any conventional method which is known to the skilled person may be employed.

The EU-1 zeolite obtained thereby is identified by X ray diffractometry. Its crystallinity is calculated from the diffraction diagram by comparison with a reference zeolite with structure type EUO with a given crystallinity. In the examples of the present application, the reference zeolite with structure type EUO was selected to be the EU-1 zeolite prepared using the process of the invention of Example 1; its crystallinity is thus fixed at 100%. The crystallinity corresponds to the ratio of the surface area of the peaks of the solids analyzed to the surface area of the peaks of the reference zeolite with structure type EUO, after subtraction of the background noise, in the diffraction angle range $2\theta$ of 13° to 32°.

The EU-1 zeolite obtained by the preparation process of the present invention has a diffraction diagram in accordance with that of zeolites with structure type EUO and it has a crystallinity which is preferably more than 90%, more preferably more than 95% and highly preferably more than 98%.

The process for preparing an EU-1 zeolite with a $XO_2/Y_2O_3$ ratio in the range 10 to 100 of the invention thus means that an EU-1 zeolite can be obtained with a crystallinity which is greater than that of an EU-1 zeolite obtained by preparation processes which are known to the skilled person.

The EU-1 zeolite obtained by the preparation process of the present invention preferably has a crystallinity which is 10% higher, preferably 20% higher than that of an EU-1 zeolite obtained by a preparation process comprising neither step b) nor step c) of the process of the invention.

The following examples illustrate the invention without limiting its scope.

EXAMPLES

Example 1

Preparation of an EU-1 Zeolite with a $SiO_2/Al_2O_3$ Ratio of 40 and a $Na^+/SiO_2$ Ratio of 0.09 Using the Preparation Process of the Present Invention An aqueous solution of hexamethonium hydroxide was prepared by allowing 6 g of hexamethonium bromide (Acros) to react with 4.6 g of silver oxide (Alfa Aesar) in 12 g of distilled water. This mixture was stirred overnight away from light. After separating out the AgBr precipitate by filtration, a solution containing 25% of hexamethonium hydroxide was recovered. Next, 9.41 g of this solution was added to 9.97 g of colloidal silica (Ludox HS40, Sigma Aldrich) and 26.9 g of distilled water. After stirring vigorously for 30 minutes, a solution formed by 0.31 g of sodium aluminate (Carlo Erba) and 13.4 g of distilled water was added. This mixture was matured for 2 hours.

The molar composition of the reaction mixture was as follows:

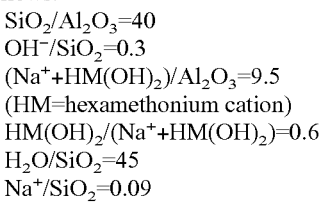

$SiO_2/Al_2O_3=40$
$OH^-/SiO_2=0.3$
$(Na^++HM(OH)_2)/Al_2O_3=9.5$
(HM=hexamethonium cation)
$HM(OH)_2/(Na^++HM(OH)_2)=0.6$
$H_2O/SiO_2=45$
$Na^+/SiO_2=0.09$ The reaction mixture was then dried by heating at 80° C., with stirring, until a dry powder was obtained with no traces of water (h=0%). 5 g of this dry powder was placed on a stainless steel support which was located in the central portion of a stainless steel autoclave with a volume V=100 mL. 5 mL of distilled water (H=5 g) was introduced into the bottom of the autoclave. The total quantity of water in the autoclave was equal to 5 g. According to the Van der Waals equation, a quantity of water of 0.5 g is sufficient to generate a liquid phase at 180° C. in a 100 mL autoclave. During the hydrothermal treatment, a liquid phase was thus present. The hydrothermal treatment was carried out for a period of 7 days at 180° C. by introducing the autoclave into a ventilated 50 L Binder oven. The product was recovered, washed with 500 mL of distilled water and dried at 100° C.

X ray diffraction analysis showed that the sample had been completely transformed into EU-1 zeolite. The crystallinity of this sample was taken as the reference and arbitrarily fixed at 100%.

Comparative Example 2

This sample was prepared using the operating procedure described in Example 1 (h=0%) except that no distilled water was introduced into the bottom of the autoclave (H=0 g) and that the total quantity of water in the autoclave was equal to 0 mL.

After 7 days of hydrothermal treatment at 180° C., X ray diffraction analysis showed that the sample was still completely amorphous.

Example 3

Preparation of an EU-1 Zeolite with a $SiO_2/Al_2O_3$ Ratio of 40 and a $Na^+/SiO_2$ Ratio of 0.09 Using the Preparation Process of the Present Invention This sample was prepared using the operating procedure described in Example 1, but drying was stopped when the dried reaction mixture had a water content of h=15% by weight of water. No distilled water was introduced into the bottom of the autoclave (H=0 g). The total quantity of water in the autoclave was equal to 0.75 g. After 7 days of hydrothermal treatment at 180° C., X ray diffraction analysis showed that the sample had been completely transformed into EU-1 zeolite. The crystallinity of the sample was 95% compared with the reference sample produced in Example 1.

Example 4

Preparation of an EU-1 Zeolite with a $SiO_2/Al_2O_3$ Ratio of 40 and a $Na^+/SiO_2$ Ratio of 0.09 Using the Preparation Process of the Present Invention This sample was prepared using the operating procedure described in Example 1 (h=0% and H=5 g), except that the hydrothermal treatment at 180° C. was stopped after 3 days. X ray diffraction analysis showed that the sample had been transformed into EU-1 zeolite and the crystallinity of the sample was 99% compared with the reference sample produced in Example 1.

Example 5

Preparation of an EU-1 Zeolite with a $SiO_2/Al_2O_3$ Ratio of 30 and a $Na^+/SiO_2$ Ratio of 0.15 Using the Preparation Process of the Present Invention The hexamethonium hydroxide solution was prepared as described in Example 1. Next, 9.36 g of this solution was added to 9.92 g of colloidal silica (Ludox HS40, Sigma Aldrich) and 26.7 g of distilled water. After stirring vigorously for 30 minutes, a solution formed by 0.62 g of sodium aluminate (Carlo Erba) and 13.3 g of distilled water was added. This mixture was matured for 2 hours.

The molar composition of the reaction mixture was as follows:
$SiO_2/Al_2O_3=30$
$OH^-/SiO_2=0.3$
$(Na^++HM(OH)_2)/Al_2O_3=6$
(HM=hexamethonium cation)
$HM(OH)_2/(Na^++HM(OH)_2)=0.5$
$H_2O/SiO_2=45$
$Na^+/SiO_2=0.15$ Drying and the hydrothermal treatment were carried out as described in Example 1 (h=0% and H=5 g). The product was recovered, washed with distilled water (500 mL) and dried at 100° C.

X ray diffraction analysis showed that the sample had been completely transformed into EU-1 zeolite. The crystallinity of this sample was 90% compared with the reference sample produced in Example 1.

Example 6

Preparation of an EU-1 Zeolite with a $SiO_2/Al_2O_3$ Ratio of 60 and a $Na^+/SiO_2$ Ratio of 0.06 Using the Preparation Process of the Present Invention An aqueous hexamethonium hydroxide solution was prepared as described in Example 1. Next, 9.42 g of this solution was added to 9.98 g of colloidal silica (Ludox HS40, Sigma Aldrich) and 27.0 g of distilled water. After stirring vigorously for 30 minutes, a solution formed by 0.21 g of sodium aluminate (Carlo Erba) and 13.5 g of distilled water was added. This mixture was matured for 2 hours.

The molar composition of the reaction mixture was as follows:
$SiO_2/Al_2O_3=60$
$OH^-/SiO_2=0.3$
$(Na^++HM(OH)_2)/Al_2O_3=12.8$
(HM=Hexamethonium Cation)
$HM(OH)_2/(Na^++HM(OH)_2)=0.7$
$H_2O/SiO_2=45$
$Na^+/SiO_2=0.06$ Drying and the hydrothermal treatment were carried out as described in Example 1 (h=0% and H=5 g). The product was recovered, washed with distilled water (500 mL) and dried at 100° C.

X ray diffraction analysis showed that the sample had been completely transformed into EU-1 zeolite. The crystallinity of this sample was 99% compared with the reference sample produced in Example 1.

Example 7

Preparation of an EU-1 Zeolite with a $SiO_2/Al_2O_3$ Ratio of 40 and a $Na^+/SiO_2$ Ratio of 0 Using the Preparation Process of the Present Invention An aqueous hexamethonium hydroxide solution was prepared as described in Example 1. Next, 9.44 g of this solution was added to 4.00 g of a pyrogenic silica (Aerosil 380, Degussa) and 31.0 g of distilled water. After stirring vigorously for 30 minutes, a solution formed by 0.68 g of aluminium isopropoxide (Aldrich) and 15.5 g of distilled water was added. This mixture was matured for 2 hours.

The molar composition of the reaction mixture was as follows:
$SiO_2/Al_2O_3=40$
$OH^-/SiO_2=0.3$
$(Na^++HM(OH)_2)/Al_2O_3=6$
(HM=Hexamethonium Cation)
$HM(OH)_2/(Na^++HM(OH)_2)=1$
$H_2O/SiO_2=45$
$Na^+/SiO_2=0$ Drying and the hydrothermal treatment were carried out as described in Example 1 (h=0% and H=5 g). The product was recovered, washed with distilled water (500 mL) and dried at 100° C.

X ray diffraction analysis showed that the sample had been completely transformed into EU-1 zeolite. The crystallinity of this sample was 98% compared with the reference sample produced in Example 1.

Comparative Example 8

Preparation of an EU-1 Zeolite with a $SiO_2/Al_2O_3$ Ratio of 40 and a $Na^+/SiO_2$ Ratio of 0.09 Using a Process Comprising Neither Drying Step b) Nor Step c) of the Process of the Invention, but a Conventional Hydrothermal Treatment An aqueous hexamethonium hydroxide solution was prepared as described in Example 1. Next, 9.97 g of this solution was added to 9.41 g of colloidal silica (Ludox HS40, Sigma Aldrich) and 26.9 g of distilled water. After stirring vigorously for 30 minutes, a solution formed by 0.31 g of sodium aluminate (Carlo Erba) and 13.4 g of distilled water was added. This mixture was matured for 2 hours.

The molar composition of the reaction mixture was as follows:
$SiO_2/Al_2O_3=40$
$OH^-/SiO_2=0.3$
$(Na^++HM(OH)_2)/Al_2O_3=9.5$
(HM=hexamethonium cation)
$HM(OH)_2/(Na^++HM(OH)_2)=0.6$
$H_2O/SiO_2=45$
$Na^+/SiO_2=0.09$ The reaction mixture was transferred into a stainless steel autoclave (Autoclave France) with a volume V=100 mL. The hydrothermal treatment was carried out without stirring for a period of 7 days at 180° C. by introducing the autoclave into a ventilated 50 L Binder oven. The product was recovered, washed with distilled water (500 mL) and dried at 100° C.

X ray diffraction analysis showed that the sample had been completely transformed into EU-1 zeolite. The crystallinity of this sample was 81% compared with the reference sample produced in Example 1.

Comparative Example 9

Preparation of an EU-1 Zeolite with a $SiO_2/Al_2O_3$ Ratio of 40 and a $Na^+/SiO_2$ Ratio of 0.09 Using a Process Comprising Neither Drying Step b) Nor Step c) of the Process of the Invention, but a Conventional Hydrothermal Treatment This sample was prepared using the operating procedure described in comparative Example 8. In contrast, the hydrothermal treatment at 180° C. was stopped after 3 days. X ray diffraction analysis showed that the sample had been partially transformed into EU-1 zeolite. A portion of the sample was still amorphous. The crystallinity was 49% compared with the reference sample produced in Example 1.

The invention claimed is:

1. A process for preparing an EU-1 zeolite having a $XO_2/Y_2O_3$ ratio in the range 10 to 100, comprising:
   a) mixing, in an aqueous medium, at least one source of at least one oxide $XO_2$, X being silicon and/or germanium, at least one source of at least one oxide $Y_2O_3$, Y being aluminium, iron, gallium and boron, and at least one organic template Q, said reaction mixture having the following molar composition:

| | |
|---|---|
| $XO_2/Y_2O_3$ | 10 to 100; |
| $OH^-/XO_2$ | 0.1 to 6.0; |
| $(M^+ + Q)/Y_2O_3$ | 0.5 to 100; |
| $Q/(M^+ + Q)$ | 0.1 to 1; |
| $H_2O/XO_2$ | 1 to 100; |
| $M^+/XO_2$ | 0 to 0.15; | where $M^+$ represents an alkali metal or ammonium monovalent cation;
   b) drying the reaction mixture derived from a) at a temperature of less than 200° C.;
   c) hydrothermal treatment of the dried reaction mixture derived from b) in an autoclave, said dried reaction mixture not being in contact with a liquid phase at the bottom of the autoclave, whereby EU-1 zeolite is produced.

2. A preparation process according to claim 1, in which X is silicon, Y is aluminium and Q is hexamethonium hydroxide.

3. A preparation process according to Claim 1, in which $M^+/XO_2$ is in the range of 0.01 to 0.12.

4. A preparation process according to Claim 1, in which $M^+$ is, $Na^+$.

5. A preparation process according to Claim 4 comprising a ratio of $Na^+/SiO_2$ in the range of 0.01 to 0.12.

6. A preparation process according to Claim 1 comprising adding to said aqueous medium seeds comprising crystalline solids with structure types LTA, LTL, FAU, MOR, MAZ, OFF, FER, ERI, BEA, MFI, MTW, MTT, LEV, TON, NES or EUO seeds/$XO_2$ ratio in the range of 0.0001 to 0.1 $XO_2$ by weight.

7. A preparation process according to Claim 1, in which b) drying the reaction mixture is carried out at a temperature of less than 120° C.

8. A preparation process according to Claim 7, in which b) drying the reaction mixture is carried out at a temperature of less than 100° C.

9. A preparation process according to Claim 1, in which the dried reaction mixture derived from b), contains a quantity by weight of water, h, equal to 0%, and is introduced into the autoclave and a mass, H, of distilled water is introduced into the bottom of the autoclave out of contact with said reaction mixture.

10. A preparation process according to Claim 1, in which the dried reaction mixture derived from b), contains a quantity by weight of water, h, and is introduced into the autoclave, and a mass, H, of distilled water is introduced into the bottom of the autoclave out of contact with said reaction mixture.

11. A preparation process according to Claim 1, in which the reaction mixture derived from b), is partially dried to a mass content, h, of water, and is introduced into the autoclave.

12. A preparation process according to Claim 1, in which c) is carried out under the following hydrothermal conditions: an autogenous reaction pressure, and a temperature in the range 120° C. to 200° C.

13. A preparation process according to Claim 1 conducted with a reaction time varies of between 1 hour and several months.

14. A preparation process according to Claim 13, in which the reaction time varies between 1 day and 3 weeks.

15. A preparation process according to Claim 13, in which the reaction time is in the range of 2 to 8 days.

16. A preparation process according to Claim 3, in which X is silicon, Y is aluminium and Q is hexamethonium hydroxide.

17. A preparation process according to Claim 4, in which X is silicon, Y is aluminium and Q is hexamethonium hydroxide.

18. A preparation process according to Claim 5, in which X is silicon, Y is aluminium and Q is hexamethonium hydroxide.

19. A process for preparing an EU-1 zeolite having a $XO_2/Y_2O_3$ ratio of 10-100, comprising hydrothermal treatment of the product of drying an aqueous mixture at a temperature of less than 200° C., said product comprising of at least one source of at least one oxide $XO_2$, X being silicon and/or germanium, at least one source of at least one oxide $Y_2O_3$, Y being aluminium, iron, gallium or boron, and at least one organic template Q, and having the following molar composition:

| | |
|---|---|
| $XO_2/Y_2O_3$ | 10 to 100; |
| $OH^-/XO_2$ | 0.1 to 6.0; |
| $(M^+ + Q)/Y_2O_3$ | 0.5 to 100; |
| $Q/(M^+ + Q)$ | 0.1 to 1; |
| $H_2O/XO_2$ | 1 to 100; |
| $M^+/XO_2$ | 0 to 0.2; | where $M^+$ represents an alkali metal or ammonium monovalent cation.

* * * * *

UNITED STATES PATENT AND TRADEMARK OFFICE
CERTIFICATE OF CORRECTION

PATENT NO. : 8,557,220 B2
APPLICATION NO. : 12/601199
DATED : October 15, 2013
INVENTOR(S) : Goergen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 396 days.

Signed and Sealed this
Fifteenth Day of September, 2015

Michelle K. Lee
*Director of the United States Patent and Trademark Office*